Patented Dec. 16, 1930

1,785,115

UNITED STATES PATENT OFFICE

HARRY B. DYKSTRA, OF WILMINGTON, DELAWARE, ASSIGNOR, BY MESNE ASSIGNMENTS, TO THE GRASSELLI CHEMICAL COMPANY, OF CLEVELAND, OHIO, A CORPORATION OF DELAWARE

SOLDERING FLUX

No Drawing.   Application filed May 7, 1930.   Serial No. 450,599.

Rosin, or colophony, is one of the commonest fluxes used in soft soldering operations.

I have found that certain derivatives of rosin, namely chlorinated rosin, have fluxing properties which, in many instances, are superior to the fluxing properties of ordinary rosin; and my invention comprises soft soldering operations in which chlorinated rosin is applied as the flux, and the novel fluxes themselves.

Rosin, or colophony, is the residue obtained after distilling turpentine from pitch. Chemically it is a complex mixture of alicyclic acids and their anhydrides in which abietic acid predominates. The action of chlorine upon rosin produces new compounds containing chlorine in the molecules. Various amounts of chlorine can be taken up by the molecules of the rosin acid and a whole series of chlorinated rosin products can be obtained. Physically these new products differ from their mother substance in that they have higher melting points and lower solubilities in organic solvents. The increase in melting point seems to be one of the properties which makes the chlorinated rosin products more desirable for fluxing properties. By varying the amount of chlorine introduced into rosin, products of different melting points can be obtained and it is thereby possible to select a flux of the optimum fusibility for any kind of soldering job.

A chlorinated rosin containing 24.9% chlorine prepared by me had a melting point of approximately 100° C., which is 20° higher than the rosin from which the chlorinated rosin was prepared.

Chlorinated rosin products are used as soldering fluxes in a manner generally similar to the use of ordinary colophony. They can be reduced to powder and sprinkled over the pieces to be soldered, or the soldering iron can be wiped with solid chlorinated rosin, or solutions or emulsions of chlorinated rosin can be brushed over the metal pieces to be united.

A very efficient solder is, for instance, obtained by using chlorinated rosin containing 25% chlorine as the flux on soldering tin plate with the common 50–50 lead tin solder. Similarly, good results are obtained on galvanized steel and other metals, and using chlorinated rosins of another chlorine content.

I claim:

1. In a process of soft soldering, the step of applying a flux comprising a chlorinated rosin.

2. A soldering flux comprising a chlorinated rosin.

In testimony whereof, I affix my signature.

HARRY B. DYKSTRA.